E. B. WILSON & C. I. ROBINSON.
ADVERTISING ORDER RECORD.
APPLICATION FILED MAR. 27, 1911.

1,079,461. Patented Nov. 25, 1913.

2 SHEETS—SHEET 1.

*Fig. 1*

E. B. WILSON & C. I. ROBINSON.
ADVERTISING ORDER RECORD.
APPLICATION FILED MAR. 27, 1911.

1,079,461. Patented Nov. 25, 1913.

*Fig. 2*

> Farm for $7000
> For Sale — 25 Acre Farm 15 miles from city,
> brick house and large barn on property,
> one half of land in cultivation. Easy terms —
> Real Estate Trust Co.
> 311 Fourth Ave.

Post — Please publish above copy on dates indicated in below schedule.

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| Dispatch | | | | | | | | | | | | | | | | | | | | | | | | | | | | | | | |
| Gazette | | | | | | | | | | | | | | | | | | | | | | | | | | | | | | | |
| Post | | | | | | | | | ✓ | | ✓ | | ✓ | ✓ | ✓ | | | | | | | | | | | | | | | | |
| ChronTel | | | | | | | | | | | | | | | | | | | | | | | | | | | | | | | |
| Leader | | | | | | | | | | | | | | | | | | | | | | | | | | | | | | | |
| Press | | | | | | | | | | | | | | | | | | | | | | | | | | | | | | | |
| Sun | | | | | | | | | | | | | | | | | | | | | | | | | | | | | | | |

Date of Order 1-7-08
Copy Number 17861

SPACE Clasf Minimum   Set Solid   8   REAL ESTATE TRUST CO.
By J. Doe

File Copy — Please publish above copy on dates indicated in below schedule.

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| Dispatch | | | | | | | | | | | | | | | | | | | | | | | | | | | | | | | |
| Gazette | | | | | | | | | | | | | | | | | | | | | | | | | | | | | | | |
| Post | | | | | | | | | ✓ | | ✓ | | ✓ | ✓ | ✓ | | | | | | | | | | | | | | | | |
| ChronTel | | | | | | | | | | | | | | | | | | | | | | | | | | | | | | | |
| Leader | | | | | | | | | | | | | | | | | | | | | | | | | | | | | | | |
| Press | | | | | | | | | | | | | | | | | | | | | | | | | | | | | | | |
| Sun | | | | | | | | | | | | | | | | | | | | | | | | | | | | | | | |

Date of Order 1-7-08
Copy Number 17861

SPACE Clasf Minimum   Set Solid   REAL ESTATE TRUST CO.
By J. Doe

WITNESSES:
Fred E. Miller

INVENTORS
Edwin B. Wilson
Carl I. Robinson
BY Barbour
ATTORNEY

UNITED STATES PATENT OFFICE.

EDWIN B. WILSON, OF BROOKLYN, NEW YORK, AND CARL I. ROBINSON, OF PITTSBURGH, PENNSYLVANIA.

ADVERTISING-ORDER RECORD.

1,079,461.  Specification of Letters Patent.  Patented Nov. 25, 1913.

Application filed March 27, 1911. Serial No. 617,200.

*To all whom it may concern:*

Be it known that we, EDWIN B. WILSON and CARL I. ROBINSON, citizens of the United States, and residents, respectively, of Brooklyn, in the county of Kings and State of New York, and Pittsburgh, in the county of Allegheny and State of Pennsylvania, have invented a new and useful Improvement in Advertising-Order Records, of which the following is a specification.

Our invention relates to order forms and records and particularly to the orders issued by real estate and other advertisers to newspapers and publications.

The object of our invention is to provide a simple and inexpensive form and record, of the class above indicated, that shall require a minimum amount of time and labor in preparation by the advertisers and that shall comprise a single file copy record on which is indicated, by a series of marks or checks, all the instructions as to space, dates of publication, etc., contained in the orders to the several publications in which the same advertisement is to be inserted.

It is customary for real estate companies and other large advertisers to use order blanks which are attached to their advertising matter or "copy" and are sent to newspapers and magazines for publication. These orders are usually made out in duplicate, one copy being retained for the advertiser's record and consists of the necessary instructions as to space, dates of publication, form of setting and the like. This method involves considerable clerical work, especially where advertisements are sent to a large number of publications, for example: In large cities, real estate companies frequently send the same advertising "copy" to from five to ten daily newspapers or other publications, the advertisement being ordered to appear on different dates in each publication. In such cases a corresponding number of different orders have been made out and attached to a copy of the same advertisement and the same number of different file copies are retained by the advertiser for record. Not only is the work of making out the orders considerable, but the necessary filing space and the work of checking the bills, etc., is very much increased under the above mentioned system.

According to our present invention, the disadvantages just referred to are avoided by combining into one form an order sheet and an advertising "copy" blank, and into another form a record sheet and an advertising "copy" blank. For any given advertising "copy," it is only necessary to make use of one record sheet and as many order sheets as there are different publications in which the "copy" is to appear. The "copy" may be produced on all of the sheets at the same time by the usual method of carbon manifolding, and the form of the sheets is such that it is only necessary to use simple marks or checks for the purpose of properly instructing the publishers and retaining an adequate record.

Our invention is illustrated in the accompanying drawings, in Figure 1 of which is shown two orders sheets prepared for different publications, and a record sheet arranged in accordance therewith. A modification which also embodies our invention, but which requires a single form instead of two forms is illustrated in Fig. 2.

Referring to Figs. 1 and 2 of the drawings, the sheets 1 and 2 here shown are preferably made on the same form and are filled in to constitute separate orders to different publishers, for example, to the "*Press*" and the "*Dispatch*." At the upper right-hand corner of each sheet, indicated by reference character 3, "Form A" appears. Any suitable legend may, of course, be employed for identifying the printed form, and "Copy and order for publication" appears at 4 near the top of each sheet. The body of each of the sheets is blank in the form and is filled in with the advertising "copy" which is to be inserted in the publication, a characteristic real estate company's advertisement being shown on sheet 1 for the purpose of illustration. Near the bottom of the sheets at 5, appear the words "Publisher——— Please publish above copy as indicated below." The blank which is found in the form after "Publisher" is filled in with the name of the publication or some notation identifying the advertising vehicle in which the advertising "copy" above referred to, is to appear. A perpetual calendar 6, bearing a series of numerals from 1 to 31 to indicate the days of the month, and a blank square at 7 for the date of the order appears directly below the quotation just referred to. The date of the order may be filled in as indicated and a series of checks or other marks are made in the small squares which are ruled off by cross section lines 8 directly below the numerals indicating the day of the month. By this means the respective publishers are informed that the advertisement found on the sheet is to appear in January, the month in which the order is dated, unless otherwise indicated, on the 10th, 12th, 14th, 16th and 18th days of the month in the "*Press*", and on the 9th, 11th, 13th, 17th and 19th in the "*Dispatch*". Below the "Date of order" a numeral which identifies the advertisement in the records of the advertiser is found under the heading "Copy No." in space 9. Also the words "Display: Classified: Inches: Lines:————. Remarks:————," appear near the bottom of the sheet for the purpose of indicating the form and setting of the advertisement. One of the terms "Display" or "Classified" is canceled to suit the desires of the advertiser, and one of the terms "Inches" or "Lines" is canceled for the same reason. At the lower right-hand corner of the sheet the word "Signed" appears in parenthesis, followed by broken lines as a guide to the signature of the advertiser or his agent. Other order sheets may be made out on the same form as that of sheets 1 and 2 and similar to them in every respect, the name "*Gazette*", "*Leader*", or some other suitable legend being substituted for the "*Dispatch*" and "*Press*" after "Publisher," and the checks indicating the times of appearance in the publication be changed as desired. The record sheet is made on another form which is marked in some suitable manner, such as "Form B" in the upper right-hand corner of the sheet. This sheet may be headed "Advertising copy and record for filing," as indicated at 12. A space for the advertising copy is left as in "Form A" and at 13 in place of the words of address to the publisher, appears the following: "Above advertisement ordered published as per schedule below." The perpetual calendar, the date of order, copy number and the form and setting instructions are the same, but the names of all the publications or publishers to which orders are likely to be directed by any given advertiser are listed at 14 and the sheet is provided with lines defining spaces alined transversely with the list of publications and vertically with the numerals indicating the days of the month. These numerals constitute what I term, for convenience, a perpetual calendar. It is, therefore, evident that a mark or check in any of the squares produced by the aforesaid lines, signifies not only the day of the month of which the advertisement is to appear, but also the publication in which it will appear. For example, the real estate advertisement or "copy" which is filled in on each of the sheets 1, 2 and 3 might be inserted on different days in any one of the daily newspapers of the city in which the property or real estate company is located. Each of the order sheets is completely identified with the file copy sheet by the date of order and copy number which respectively appear in the appropriately designated spaces 7 and 9.

Referring to Fig. 2 of the drawings, as here shown, the same form may be utilized for both the order and the file copies. In this case the form is similar to the file copy form shown in Fig. 1, except that the words of address to the publisher found in sheets 1 and 2 of Fig. 1 are substituted for the expression "Above advertisement ordered published as specified below." The disadvantage in using the same form for all of the orders is that the name of several publications or publishers appears on each order sheet, and the possibility of an error in checking and confusion on the part of the publisher is greater. In either case, the file sheet constitutes a complete record of all of the orders.

Several advertisements may be filled in on each order sheet to constitute the "copy" and the blank spaces found on the forms will, of course, be proportioned according to the requirements of the advertiser.

It is evident that modifications in size and arrangement of the sheets and of the matter appearing thereon may be effected without departing from the spirit of our invention and that the record is not limited to advertising purposes alone, consequently, we desire that only such limitations in the scope of our invention be imposed as are indicated in the appended claims.

We claim as our invention:

1. An order record comprising a file copy sheet and a plurality of order copy sheets each having a correspondingly located and an appropriately designated space on which the subject-matter of the order may be concurrently produced by manifolding, a suitably defined and correspondingly located space adapted to receive identifying data, and a perpetual calendar comprising a series of legends indicating periods of time, the file copy sheet having a list of addressees and being ruled to provide spaces alining in one direction with the list of addressees and in another direction with the legends which constitute the perpetual calendar whereby the file copy sheet is adapted to be marked to constitute a complete record of the order copy sheets.

2. An advertising record comprising a file copy sheet and a plurality of order copy sheets having appropriately designated spaces for advertising matter, and appropriately designated and suitably defined spaces for the copy number, date of the order and identifying data adapted to register when superposed, and a perpetual calendar comprising a series of numerals indicating days of the month, the perpetual calendar of the order copy sheets being adapted to be checked to complete the order and the file copy sheet having a list of publications and being ruled to provide spaces alined transversely with the list of publications and vertically with the numerals indicating the days of the month whereby the file copy sheet is adapted to be checked to constitute a complete record of the order copy sheets.

3. An advertising order record comprising a file copy sheet and a plurality of corresponding, order copy sheets having appropriately designated spaces for advertising matter correspondingly located in the middle and extending near to the top of the sheets, and being ruled to provide spaces for the copy number, date of the order, and identifying data, adapted to register when the sheets are superposed, and a perpetual calendar comprising a series of numerals indicating days of the month, the perpetual calendar of the order copy sheet being adapted to be checked to complete the order and the file copy sheet having a list of publications and being ruled near the bottom to provide spaces alined transversely with the list of publications and vertical with the numerals indicating the days of the month, said spaces for the copy number, date of the order and identifying data being located near the bottom of the sheet with said calendar whereby the file copy sheet is adapted to be checked to constitute a complete record of the order copy sheets.

In testimony whereof, I have hereunto subscribed my name this 17th day of March, 1911.

EDWIN B. WILSON.

Witnesses:
Thomas G. Simpson,
H. B. Watt.

In testimony whereof, I have hereunto subscribed my name this 11th day of March, 1911.

C. I. ROBINSON.

Witnesses:
H. M. Davies,
William J. Cooley.